(12) United States Patent
Dubeyko et al.

(10) Patent No.: US 10,521,148 B2
(45) Date of Patent: Dec. 31, 2019

(54) DATA STORAGE DEVICE BACKUP

(71) Applicant: Western Digital Technologies, Inc., San Jose, CA (US)

(72) Inventors: Viacheslav Dubeyko, San Jose, CA (US); Adam Manzanares, Newark, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 9 days.

(21) Appl. No.: 15/914,336

(22) Filed: Mar. 7, 2018

(65) Prior Publication Data
US 2019/0278482 A1 Sep. 12, 2019

(51) Int. Cl.
*G06F 3/06* (2006.01)

(52) U.S. Cl.
CPC ............ *G06F 3/065* (2013.01); *G06F 3/0619* (2013.01); *G06F 3/0643* (2013.01); *G06F 3/0644* (2013.01); *G06F 3/0656* (2013.01); *G06F 3/0659* (2013.01); *G06F 3/0679* (2013.01)

(58) Field of Classification Search
CPC ...... G06F 3/065; G06F 3/0619; G06F 3/0643; G06F 3/0656; G06F 3/0644; G06F 3/0679; G06F 3/0659
USPC ........................................................ 711/162
See application file for complete search history.

(56) References Cited

U.S. PATENT DOCUMENTS

| | | | |
|---|---|---|---|
| 6,269,431 B1 | 7/2001 | Dunham | |
| 7,031,085 B2 | 4/2006 | Miller et al. | |
| 7,694,105 B2 | 4/2010 | Sanvido | |
| 9,171,002 B1 | 10/2015 | Mam et al. | |
| 2003/0236956 A1* | 12/2003 | Grubbs | G06F 11/1458 711/162 |
| 2005/0027956 A1* | 2/2005 | Tormasov | G06F 11/1451 711/162 |
| 2008/0091894 A1* | 4/2008 | Retnamma | G06F 11/1464 711/161 |
| 2013/0332647 A1* | 12/2013 | Rabeler | G06F 8/654 711/103 |
| 2017/0177276 A1* | 6/2017 | Delaney | G06F 3/0656 |

FOREIGN PATENT DOCUMENTS

GB 2534956 A * 8/2016 ............. G06F 13/10

* cited by examiner

*Primary Examiner* — Pierre Miche Bataille
(74) *Attorney, Agent, or Firm* — Barry IP Law, P.C.

(57) ABSTRACT

A Data Storage Device (DSD) includes a memory and a non-volatile storage. Data related to one or more write requests is received in a write buffer of the memory from a host to modify a file system volume stored in a file system volume area of the non-volatile storage. The data related to the one or more write requests is de-staged into the file system volume area in at least one block to be modified in the file system volume by the one or more write requests. The data related to the one or more write requests is compiled into a backup slice in a backup buffer of the memory, and de-staged into a backup archive area of the non-volatile storage.

21 Claims, 8 Drawing Sheets

DATA STORAGE DEVICE BACKUP

BACKGROUND

Backing up data in a conventional computer system typically involves specific backup software executed by a host computer that initiates a backup operation. In such conventional systems, data to be backed up or archived is read from a Data Storage Device (DSD), such as a Hard Disk Drive (HDD) or a Solid-State Drive (SSD). The backup software executed by the host computer may prepare a backup or archive file or perform other backup management using the data retrieved from the DSD, and then store the backup or archive file back into the DSD or into a different DSD, such as an external or remote DSD.

However, the host computer may not always be available for performing a backup of data. In some cases, a host computer may not have additional processing or memory resources available for performing a backup, as may be the case with host computers that run nearly continuously with relatively high workloads. Even in cases where the host computer has resources available to perform a backup, conventional backup management performed by the host computer can ordinarily degrade system performance by requiring the host computer to retrieve data from a DSD, allocate space in a local memory of the host computer for managing backup operations, create a backup or archive file, and store the backup or archive file in the DSD.

In addition, DSDs may use newer technologies to store more data in a given physical storage space, as compared to previous DSDs. This increase in data density can result in more read errors when attempting to read data from the DSD. In many cases, the higher data density can increase the likelihood of defects in a storage media of the DSD, or make the storage media more vulnerable to data corruption caused by environmental conditions or by writing nearby data. Accordingly, there is a need to improve data backup so that it consumes less host resources and allows for better handling of read errors.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
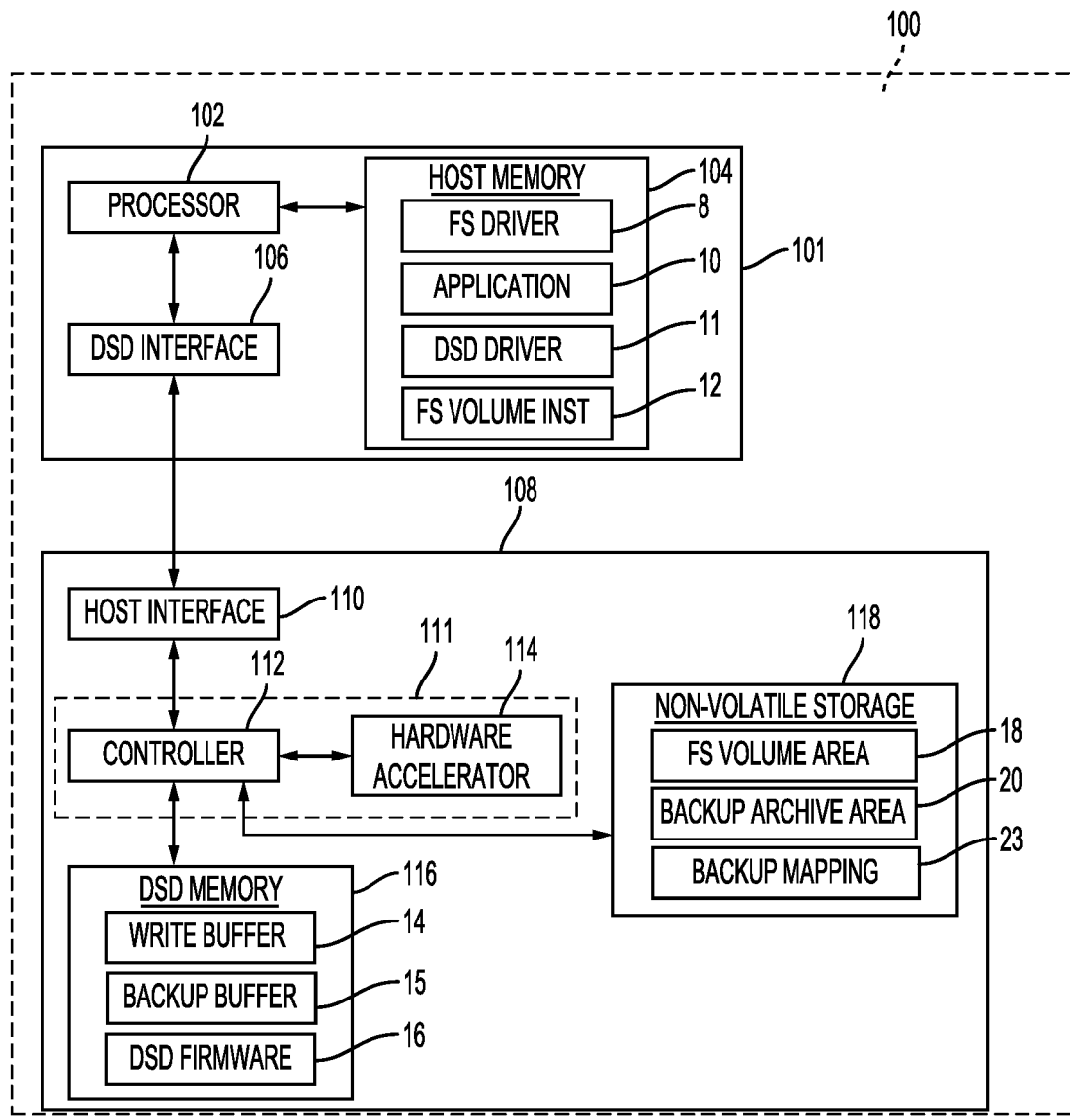
FIG. 1 is a block diagram of a host and a Data Storage Device (DSD) according to an embodiment.

FIG. 1 is a block diagram of computer system 100 including host 101 and Data Storage Device (DSD) 108 according to an embodiment. Computer system 100 can include, for example, a desktop, laptop or notebook computer or another type of electronic device such as a tablet, smartphone, network media player, portable media player, or Digital Video Recorder (DVR). In other implementations, host 101 and DSD 108 may not be physically co-located, such as where host 101 and DSD 108 communicate via a network with host 101 as in a cloud storage system or other remote storage system.

In the example of FIG. 1, host 101 includes processor 102, host memory 104, and DSD interface 106. Processor 102 can include circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System on a Chip (SoC).

Host memory 104 can represent a volatile or Non-Volatile Memory (NVM) of host 101 that interfaces with processor 102 to provide information stored in host memory 104 to processor 102 during execution of instructions in software programs, such as File System (FS) Driver 8, application 10, DSD driver 11, or an Operating System (OS) (not shown) of host 101. More specifically, processor 102 first loads computer-executable instructions received from DSD 108 into a region of host memory 104. Processor 102 can then execute the stored process instructions from host memory 104. Data to be stored in or retrieved from DSD 108 can also be stored in host memory 104 so that the data can be accessed by processor 102 during execution of software programs to the extent that such software programs have a need to access and/or modify the data.

Host memory 104 can include, for example, a Random-Access Memory (RAM), such as a Dynamic RAM (DRAM). In other implementations, host memory 104 can include other types of solid-state memory, such for example, a Magnetoresistive RAM (MRAM). While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory, or any combination thereof), NOR memory, EEPROM, Ferroelectric Memory (FeRAM), MRAM, other discrete NVM chips, or any combination thereof.

FS driver 8 can be included as part of an OS of host 101 as executable code for operating a file system volume stored in DSD 108. FS driver 8 can create an instance of a file system volume (e.g., File System (FS) volume instance 12) in an OS namespace.

Application 10 can cause processor 102 to perform processes for reading and writing data stored in DSD 108 as discussed below. In some implementations, application 10 can prepare write requests for writing data in DSD 108, and read requests for reading data from DSD 108.

DSD driver 11 provides a software interface for interacting with DSD 108 on host 101. In some implementations, application 10 or other user-space applications can generate read or write requests for DSD 108, and request performance of the read or write requests via FS driver 8 and/or DSD driver 11.

FS volume instance 12 includes user data and metadata organized into files or groups of data. In some implementations, there can be additional FS volume instances corresponding to different versions of the file system volume's state, as discussed in more detail below.

DSD interface 106 allows processor 102 to communicate with DSD 108, and may communicate according to a standard, such as, for example, Serial Advanced Technology Attachment (SATA), PCI express (PCIe), Small Computer System Interface (SCSI), Serial Attached SCSI (SAS), Ethernet, or WiFi. In this regard, host 101 and DSD 108 may communicate via a bus or may communicate over a network such as a Local Area Network (LAN) or a Wide Area Network (WAN), such as the internet. As will be appreciated by those of ordinary skill in the art, one or both of DSD interface 106 and host memory 104 can be included with processor 102 in some implementations as a single component, such as an SoC.

As shown in FIG. 1, DSD 108 includes host interface 110, circuitry 111, DSD memory 116, and non-volatile storage 118. In some implementations, DSD 108 can include, for example, a Hard Disk Drive (HDD), a Solid-State Drive (SSD), or a hybrid drive that includes different types of storage media for non-volatile storage 118. Host interface 110 allows DSD 108 to communicate with host 101, using a standard, such as, for example, SATA, PCIe, SCSI, SAS, Ethernet, or WiFi.

In the example of FIG. 1, circuitry 111 includes controller 112 and hardware accelerator 114. Controller 112 can include one or more processors for executing instructions for controlling operation of DSD 108. Controller 112 can include circuitry, such as, for example, a microcontroller, a DSP, an ASIC, a FPGA, hard-wired logic, analog circuitry and/or a combination thereof. In some implementations, controller 112 can include an SoC or may form an SoC with one or both of host interface 110 and hardware accelerator 114.

Hardware accelerator 114 can include special purpose circuitry for processing data for storage in backup archive area 20 of non-volatile storage 118. In some implementations, hardware accelerator 114 is configured to compress data received by DSD 108 for internally compiling the received data into checkpoints or snapshots for storage as backup slices in backup archive area 20. In other implementations, hardware accelerator 114 can perform other operations, such as compiling data for a checkpoint or snapshot to be stored in backup archive area 20, adding a timestamp to a checkpoint or snapshot, or de-staging the compiled backup slices from backup buffer 15 into backup archive area 20 of non-volatile storage 118. In some implementations, hardware accelerator 114 may be included as part of controller 112 or may be omitted such that the specific operation or operations performed by hardware accelerator 114 are performed by controller 112.

DSD memory 116 can represent a volatile or non-volatile memory of DSD 108 that interfaces with circuitry 111 to provide information stored in DSD memory 116 to circuitry 111 during execution of instructions in software programs such as DSD firmware 16. DSD memory 116 can include a memory that can be quickly accessed by controller 112 or hardware accelerator 114, such as a DRAM. In other implementations, DSD memory 116 can include other types of solid-state memory, including NVM, such as MRAM. As shown in FIG. 1, DSD memory 116 includes write buffer 14, backup buffer 15, and DSD firmware 16.

DSD firmware 16 can include computer-executable instructions that are loaded from non-volatile storage 118 for execution by controller 112 in controlling operation of DSD 108. In other implementations, DSD firmware 16 may instead be loaded from a dedicated NVM of DSD 108 for storing DSD firmware 16. In some implementations, as in an example where hardware accelerator 114 and/or controller 112 are an FPGA, portions of DSD firmware 16 for performing backup operations may be programmed in the field from a device external to DSD 108, such as from host 101. In operation, portions of DSD firmware 16 may be loaded into DSD memory 116 by controller 112 and/or hardware accelerator 114 in performing the processes described below.

Write buffer 14 temporarily stores or buffers data received from host 101 that is to be written to File System (FS) volume area 18 in non-volatile storage 118. Backup buffer 15 can serve as a staging area for preparing backup slices that can include a checkpoint or a snapshot to be stored in backup archive area 20 for the data written to FS volume area 18. In some implementations, write buffer 14 and backup buffer 15 may be implemented as a single buffer or memory area with one or both of write data received from host 101 and backup slices being tagged or otherwise identified for storage in FS volume area 18 or backup archive area 20, respectively.

Once de-staged into backup archive area 20, a backup slice is considered a checkpoint or a snapshot depending on whether the backup slice is to be stored for a relatively shorter period of time or to be stored for a longer period of time. As used herein, short term backup slices are referred to as checkpoints, while long term backup slices are referred to as snapshots.

In some implementations, the data for each write request received from host 101 may be backed-up or archived in backup archive area 20 as a checkpoint or as a snapshot. In other implementations, DSD 108 may periodically backup or archive data that has been received from multiple write requests as one checkpoint or snapshot. In such implementations, circuitry 111 may associate every write request with a timestamp, and aggregate the data from write requests within a particular time period for de-staging as a checkpoint or snapshot in backup archive area 20. In yet other implementations, host 101 may indicate which write requests are to be included in a checkpoint or snapshot with a special command, timestamp, checkpoint identifier, or snapshot identifier.

By backing up data using checkpoints and snapshots compiled by circuitry 111 at DSD 108, rather than by host 101 creating a backup or archive file, it is ordinarily possible to backup data without involving host 101 in the backup process. This can allow for more backup operations as compared to conventional systems for situations where host 101 may otherwise be unavailable for performing a backup operation. Backing up data without involving host 101 can also reduce the amount of commands or communications typically required between a host and a DSD to perform a backup, since host 101 does not need to retrieve data from DSD 108 and send a backup or archive file back to DSD 108 for storage. In this regard, the host is freed from having to perform backup operations, which can improve performance of the host.

In addition, by performing backup operations at the DSD instead of at the host, it is ordinarily possible to better protect more recently accessed data, as compared to a conventional backup where the host less frequently creates a backup or archive file to send to the DSD. Such conventional backup systems create a delay in backing up data that leaves data yet to be backed up or that is in the process of being backed up by the host more vulnerable to being lost. The present disclosure reduces this delay by performing backup operations at the DSD, and in many cases, without involvement of the host.

Such localized backups at DSD 108 can also allow DSD 108 to use the backed up data to recover data for otherwise "unrecoverable" read errors, since the backed up data is stored in a separate backup archive area of non-volatile storage 118, as described in more detail below. In some implementations, the recovery of backed up data to complete a read request from host 101 may be invisible or otherwise not known to host 101, so as to not affect the performance or operation of host 101. For example, DSD 108 may, without involvement of host 101, use data from a checkpoint stored in backup archive area 20 to return data to host 101 for an unrecoverable read error that would otherwise crash an application or an OS of host 101. In some implementations, DSD 108 can inform host 101 that such data was recovered from a backup.

Returning to the example of FIG. 1, non-volatile storage 118 can include, for example, one or more rotating magnetic disks, a solid-state memory, an optical storage media, or other type of non-volatile storage. As shown in FIG. 1, non-volatile storage 118 includes FS volume area 18 and backup archive area 20. In the example of FIG. 1, FS volume area 18 can be a partition configured to store data for one or more volumes of a file system related to a corresponding FS volume instance 12 in host memory 104. In other implementations, FS volume area 18 may represent a main or primary destination for storing data received in write commands from host 101, without necessarily requiring that the main or primary destination represent one or more volumes of a file system related to FS volume instance 12.

As discussed in more detail below, backup archive area 20 in some implementations can be a dedicated partition separate from FS volume area 18 that can include sub-areas reserved or designated for storing different versions or branches of a file system volume.

Backup mapping 23 can associate different identifiers for different versions of the file system volume with snapshots stored in backup archive area 20. In some implementations, the identifiers for the different versions can include version names or times used by host 101 to identify the different versions of the file system volume. Backup mapping 23 may associate such identifiers with timestamps or other identifiers for snapshots stored in backup archive area 20. As discussed in more detail below with reference to FIGS. 6 and 7, backup mapping 23 can be used by circuitry 111 to identify a snapshot corresponding to a different version of the file system volume to either recover the different version of the file system volume or to retrieve data from the different version of the file system volume. In some implementations, backup mapping 23 may include mapping information for checkpoints in addition to mapping information for snapshots. Although the example of FIG. 1 shows backup mapping 23 as being stored separate from backup archive area 20, the information of backup mapping 23 in other implementations may instead be stored in backup archive area 20.

Figure 2:
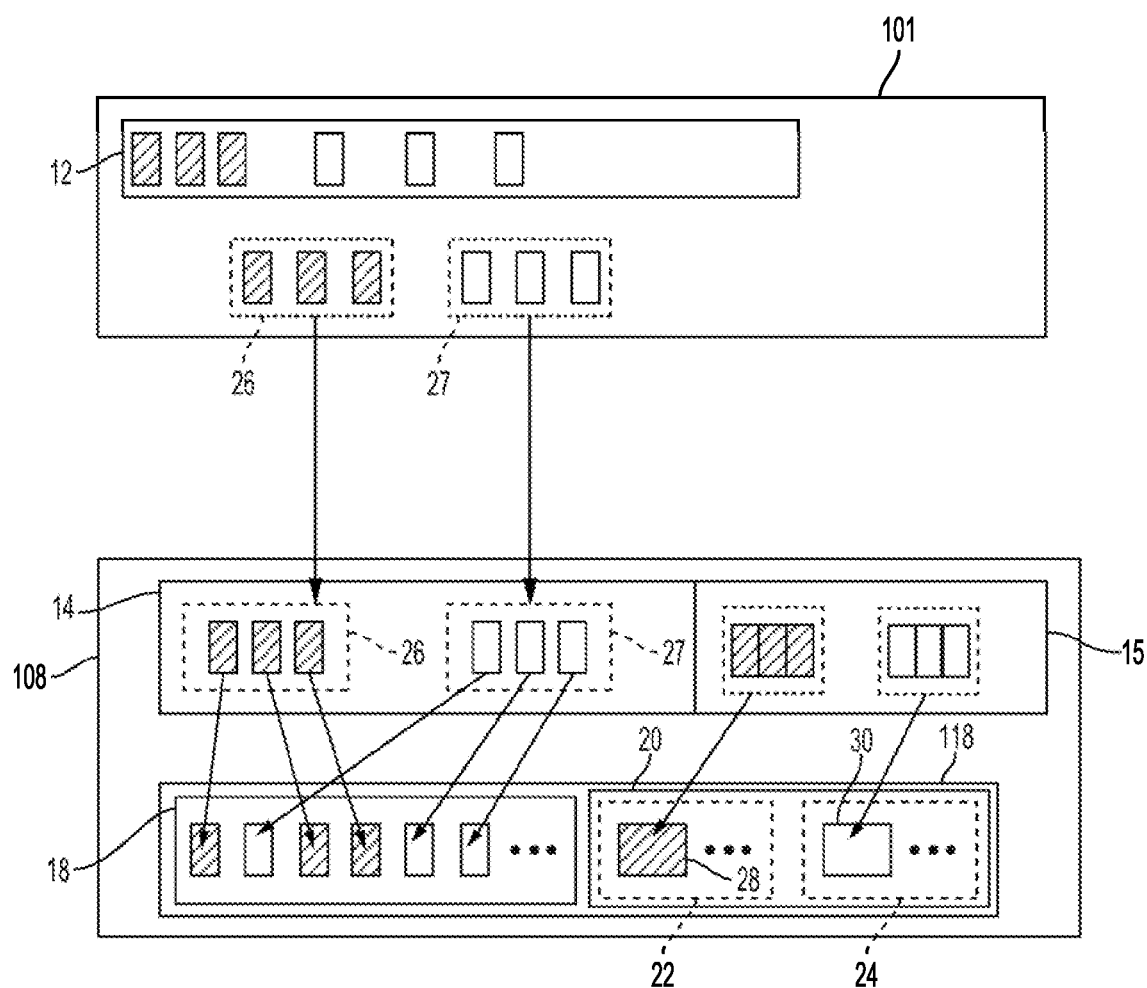
FIG. 2 illustrates a write and backup process in a DSD according to an embodiment.

FIG. 2 illustrates a write and backup process in DSD 108 according to an embodiment. In the example of FIG. 2, file system volume instance 12 at host 101 includes three blocks of user data and three blocks of metadata to be written to DSD 108. The user data blocks are indicated in FIG. 2 with cross-hatching, while the metadata blocks do not include cross-hatching. Each block can represent data associated with one or more contiguous Logical Block Addresses (LBAs) used by the file system for organizing and accessing data. As used herein, a logical address can refer to a single logical address or to a range of contiguous logical addresses.

Processor 102 of host 101 using application 10 may prepare write request 26 by grouping blocks of user data in file system volume instance 12 into write request 26, which is sent to DSD 108 using DSD driver 11 or FS driver 8 for modifying a file system volume stored in FS volume area 18 of non-volatile storage 118. In addition, processor 102 may prepare write request 27 by grouping blocks of metadata into write request 27, which is also sent to DSD 108 for modifying the file system volume stored in FS volume area 18. In other examples, write request 26 or write request 27 may include a different number of blocks of user data or metadata. As discussed in more detail below, DSD 108 can use a block-based approach for backing up data received in write requests from host 101.

Write request 26 is received by DSD 108 and the data for write request 26 is temporarily stored or buffered in write buffer 14 of DSD memory 116, while the user data from write request 26 is written to blocks in FS volume area 18. Similarly, write request 27 is received by DSD 108, and the metadata for write request 27 is temporarily stored or buffered in write buffer 14 of DSD memory 116, while the metadata from write request 27 is written to blocks in FS volume area 18.

As shown in FIG. 2, the user data from write request 26 is compiled in backup buffer 15 for storage in backup archive area 20 as checkpoint 28, and the metadata from write request 27 is compiled in backup buffer 15 for storage in backup archive 20 as snapshot 30. In this regard, backup slices such as checkpoint 28 and snapshot 30 can be used to incrementally backup data (e.g., user data and/or metadata) received from host 101 for one or more write requests. Although checkpoint 28 in the example of FIG. 2 includes only user data, other checkpoints may include metadata or a combination of user data and metadata. Similarly, snapshots other than snapshot 30 in FIG. 2 may instead include user data or a combination of metadata and user data.

In some implementations, the user data of checkpoint 28 may be compressed as part of the compilation using, for example, hardware accelerator 114. In addition, logical addresses (e.g., LBAs) for the user data included in checkpoint 28 are included with checkpoint 28 with a timestamp or other time indication of when write request 26 was received or when file system volume instance 12 was modified. Similarly, logical addresses for the metadata included in snapshot 30 are included in snapshot 30 with a timestamp or other indication of when write request 26 was received or when file system volume instance 12 was modified.

In some cases, the logical addresses and time indication included in checkpoint 28 or snapshot 30 can be used by host 101 to recover data or metadata that may be corrupted or otherwise unavailable in file system volume instance 12 at host 101 or in FS volume area 18 of non-volatile storage 118. In some examples, circuitry 111 may use the logical address and the time indication included in checkpoint 28 or snapshot 30 to recover data not able to be read from FS volume area 18, such as due to a defect in the storage media in FS volume area 18 or due to corruption of data stored in FS volume area 18 from the writing of physically proximate data in FS volume area 18 (e.g., writes to an adjacent block in a flash memory or writes to an adjacent track on a magnetic disk). As discussed in more detail below with reference to FIG. 8, the use of backup slices in backup archive area 20 can ordinarily allow for circuitry 111 to recover such corrupted data without involvement of host 101. In some implementations, backup archive area 20 may include one or more additional safeguards such as, for example, storing duplicates of backup slices in backup archive area 20, using an erasure encoding scheme for the backup slices stored in backup archive area 20, or using a more reliable storage media for backup archive area 20 than the storage media used for FS volume area 18.

The user data from write request 26 is de-staged into FS volume area 18 in respective blocks to be modified in the file system. In addition, the data for the compiled checkpoint 28 is de-staged into checkpoint sub-area 22 of backup archive area 20 in non-volatile storage 118. In this regard, checkpoint sub-area 22 can store multiple checkpoints based on data received in different write requests from host 101. As noted above, checkpoints can serve as short-term backup slices, while snapshots serve as long-term backup slices. In some implementations, checkpoint sub-area 22 can include a circular buffer that adds a new checkpoint to a head of the circular buffer, as an oldest checkpoint at the tail of the circular buffer is evicted or overwritten. Circuitry 111 may also periodically convert a most recent checkpoint in the circular buffer to a snapshot by copying the checkpoint to snapshot sub-area 24 in backup archive area 20.

The metadata from write request 27 is de-staged into FS volume area 18 in respective blocks to be modified in the file system. In addition, the compiled backup slice for snapshot 30 is de-staged into snapshot sub-area 24 of backup archive area 20. In this regard, snapshot sub-area 24 can store multiple snapshots based on data received in different write requests from host 101. As discussed in more detail below, each snapshot can facilitate the access of a different version or branch of the file system volume stored in FS volume area 18, since each compiled snapshot represents a different state of the file system volume. In this regard, some implementations may reserve a predetermined amount of storage space in backup archive area 20 for storing data to be associated with each compiled snapshot stored in backup archive area 20. This can allow room for a later selection and independent evolution of different branches or versions of the file system volume.

Figure 3:
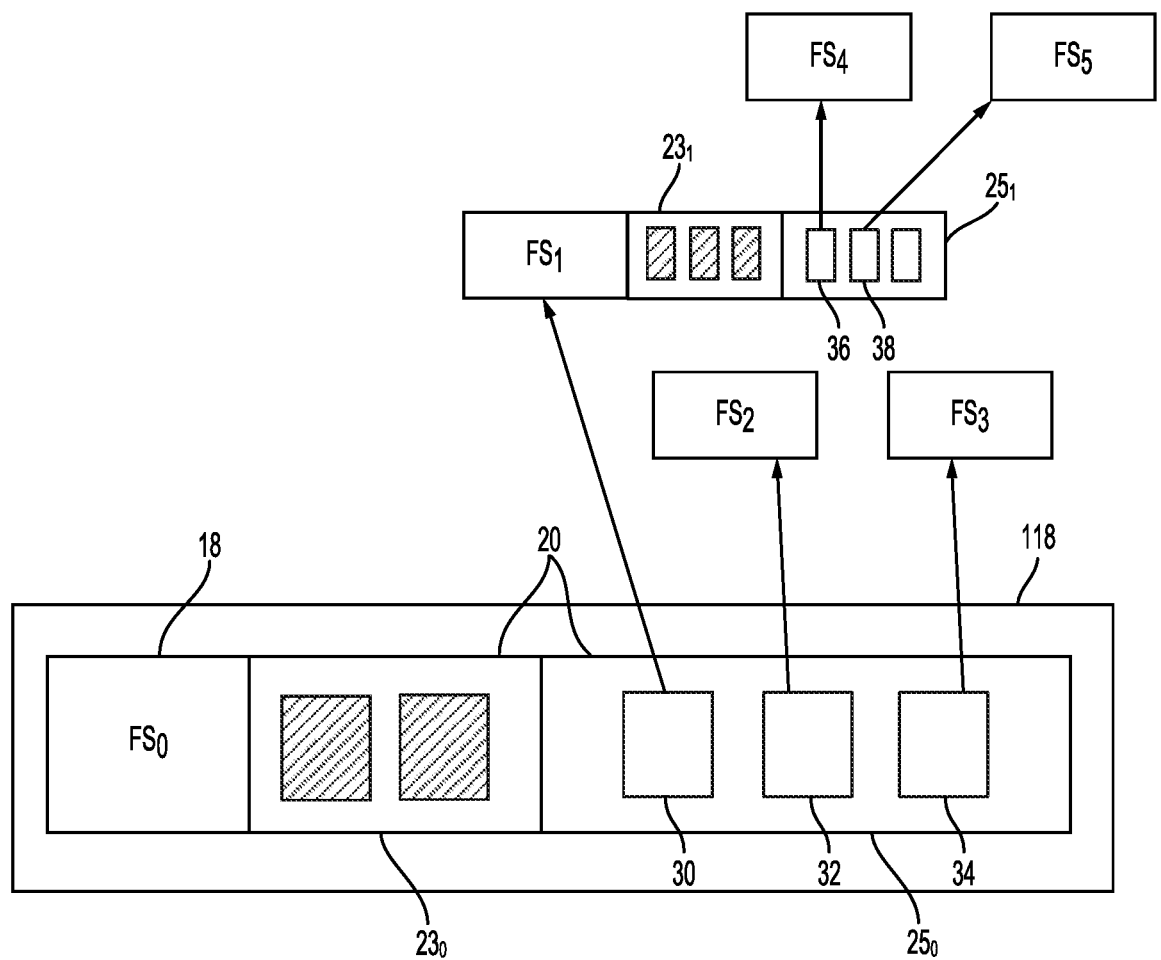
FIG. 3 illustrates the branching of different versions of a file system volume using snapshots according to an embodiment.

FIG. 3 illustrates the branching of different versions of a file system volume according to an embodiment. As shown in FIG. 3, a current or initial version of the file system volume (i.e., $FS_0$) is stored in FS volume area 18, and the backup slices for $FS_0$ are stored in backup archive area 20 as checkpoints $23_0$ and snapshots $25_0$.

Each of snapshots 30, 32, and 34 of snapshots $25_0$ can be used to create an evolution of a different version or branch of the file system volume. In the example of FIG. 3, snapshot 30 facilitates a first version of the file system volume (i.e., $FS_1$), snapshot 32 facilitates a second version of the file system volume (i.e., $FS_2$), and snapshot 34 facilitates a third version of the file system volume (i.e., $FS_3$).

Each of the different versions of the file system volume can include their own set of backup slices stored in backup archive area 20, as with the example of $FS_1$, which includes checkpoints $23_1$ and snapshots $25_1$. In addition, snapshots 36 and 38 of snapshots $25_1$ can each facilitate their own branches or versions of the file system volume as shown in FIG. 3 with $FS_4$ and $FS_5$, respectively.

In the example of FIG. 3, only the current file system version, $FS_0$, is modified directly in FS volume area 18. However, the backup slices for a particular branch (e.g., $FS_1$, $FS_2$, $FS_3$, $FS_4$, or $FS_5$) can be applied to the current version so that the particular branch replaces the current version in FS volume area 18. In such cases, host 101 may provide a special command to DSD 108 to convert FS volume area 18 to a different version by copying all of the snapshots for the different version to FS volume area 18.

By storing different sets of backup slices in backup archive area 20, it is ordinarily possible to allow host 101 to create or select different versions of FS volume instance 12 stored in non-volatile storage 118 of DSD 108. In some cases, the snapshots stored in backup archive area 20 can allow a user of host 101 or an application executing at host 101 to restore or rollback the file system volume to an earlier state before an error or before data corruption. In other cases, the snapshots stored in backup archive area 20 can allow a user or application to create different versions from the same initial file system volume that may independently evolve with different write requests issued by host 101 to DSD 108.

The independent writing of data or the independent modification of the different versions of the file system volume may be performed using, for example, special commands from host 101. For example, a user of host 101 or an application executing at host 101 may switch between, or select from among the different versions of the file system volume by identifying a restore point or a version identifier for a mount operation. A file system volume instance 12 corresponding to the restore point or the version identifier is then created in host memory 104, and file system driver 8 of host 101 can add the version identifier to read and write requests sent to DSD 108 to modify the corresponding version of the file system volume.

Example Processes

Figure 4:
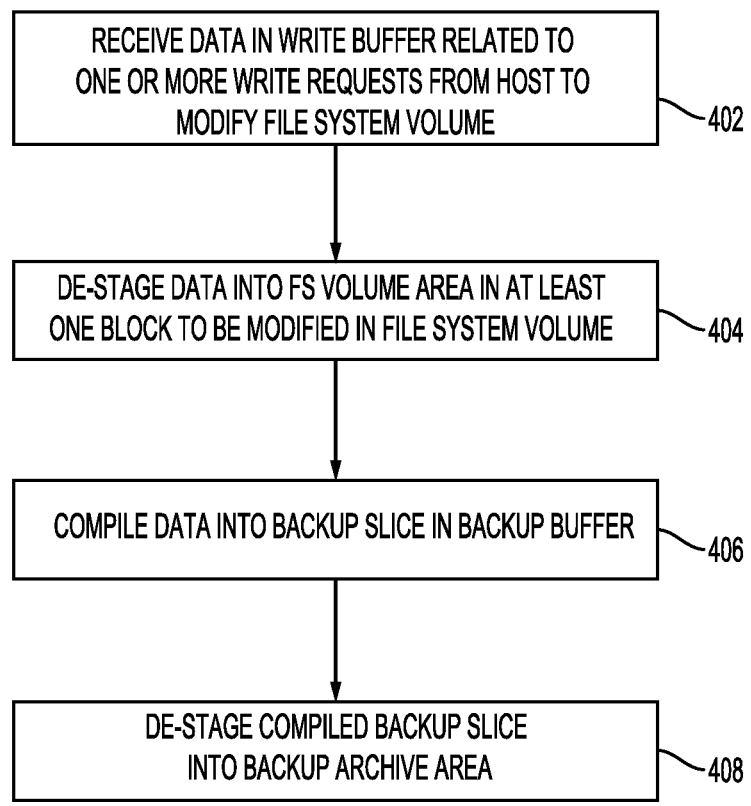
FIG. 4 is a flowchart for a write and backup process according to an embodiment.

FIG. 4 is a flowchart for a write and backup process that can be performed by circuitry 111 executing DSD firmware 16 according to an embodiment. In block 402, circuitry 111 receives data (e.g., user data or metadata) in write buffer 14 that is related to one or more write requests from host 101 to modify a file system volume stored in FS volume area 18 of non-volatile storage 118. A write request may include, for example, data that is to be written for one or more LBAs to modify one or more corresponding blocks in the file system volume.

In block 404, circuitry 111 de-stages the data stored in write buffer 14 for the one or more write requests into FS volume area 18 by copying the data into at least one block to be modified in the file system volume. In de-staging the data, circuitry 111 determines locations for storing blocks corresponding to one or more logical addresses (e.g., LBAs) indicated in the write request or write requests.

In the example of FIG. 4, circuitry 111 in block 406 compiles the data for the one or more write requests in backup buffer 15 into a backup slice as part of a backup processing. In some implementations, hardware accelerator 114 may perform some or all of the backup processing, such as by compressing or delta-encoding the data for compilation into a checkpoint or snapshot, so that it takes up less space in non-volatile storage 118. In addition, circuitry 111 adds a timestamp to the backup slice for storage in backup archive area 20 indicating when the write request was received or when the file system volume was modified. In some implementations, the timestamp may be received from host 101 with the write request. In other implementations, circuitry 111 may generate the timestamp. In such implementations, circuitry 111 can use backup mapping 23 to associate the timestamp for a snapshot with an identifier that can be used by host 101 to refer to the snapshot. In some implementations, host 101 may also be able to obtain the information from backup mapping 23 using a special command sent to DSD 108.

In block 408, circuitry 111 de-stages the backup slice compiled in block 406 into backup archive area 20 in non-volatile storage 118. Circuitry 111 determines a location for storing the backup slice in backup archive area 20 based on, for example, at least one of a timestamp for the backup slice and whether the backup slice is a checkpoint or a snapshot. In this regard, checkpoints may be stored in checkpoint sub-area 22 in FIG. 2, and snapshots may be stored in snapshot sub-area 24.

In some implementations, the order of blocks 404, 406, and 408 may be different than shown in FIG. 4, such as when the compilation of the backup slice in block 406 occurs before the data is de-staged from write buffer 14 in block 404, or when data is de-staged in block 404 while the backup slice is compiled or de-staged in blocks 406 or 408. In this regard, write requests may be queued for performance in write buffer 14, while a backup core of circuitry 111 (e.g., hardware accelerator 114) loads the data for the request into backup buffer 15 for backup processing. In another example, the data for the write request may be de-staged into FS volume area 18 concurrently with de-staging the backup slice into backup archive area 20, such as when different portions of non-volatile storage 118 can be simultaneously written (e.g., writing to different NAND dies, different hard disk surfaces, or different types of storage media).

In this regard, the independent operation of backup processing and the de-staging of data to FS volume area 18 can reduce the impact on Input/Output (I/O) performance of DSD 108 caused by performing backup processing at DSD 108. Using write buffer 14 and separate backup buffer 15 can facilitate such independent operation. In addition, such independent operation can be facilitated in some implementations with an I/O core of circuitry 111 (e.g., controller 112) dedicated to performing read and write requests, and hardware accelerator 114 dedicated to performing backup processing.

As noted above, circuitry 111 may perform backup processing for all write commands received from host 101. This can ordinarily allow for less involvement from host 101 in the backup process as compared to conventional backup processes where the host first retrieves data from a DSD and creates an archive file that is returned to the DSD for backing up data. In addition, performing backup processing for all write requests can ordinarily allow for recovering a wider variety of different states or versions of the file system volume, as discussed in more detail below with reference to FIG. 6.

Figure 5:
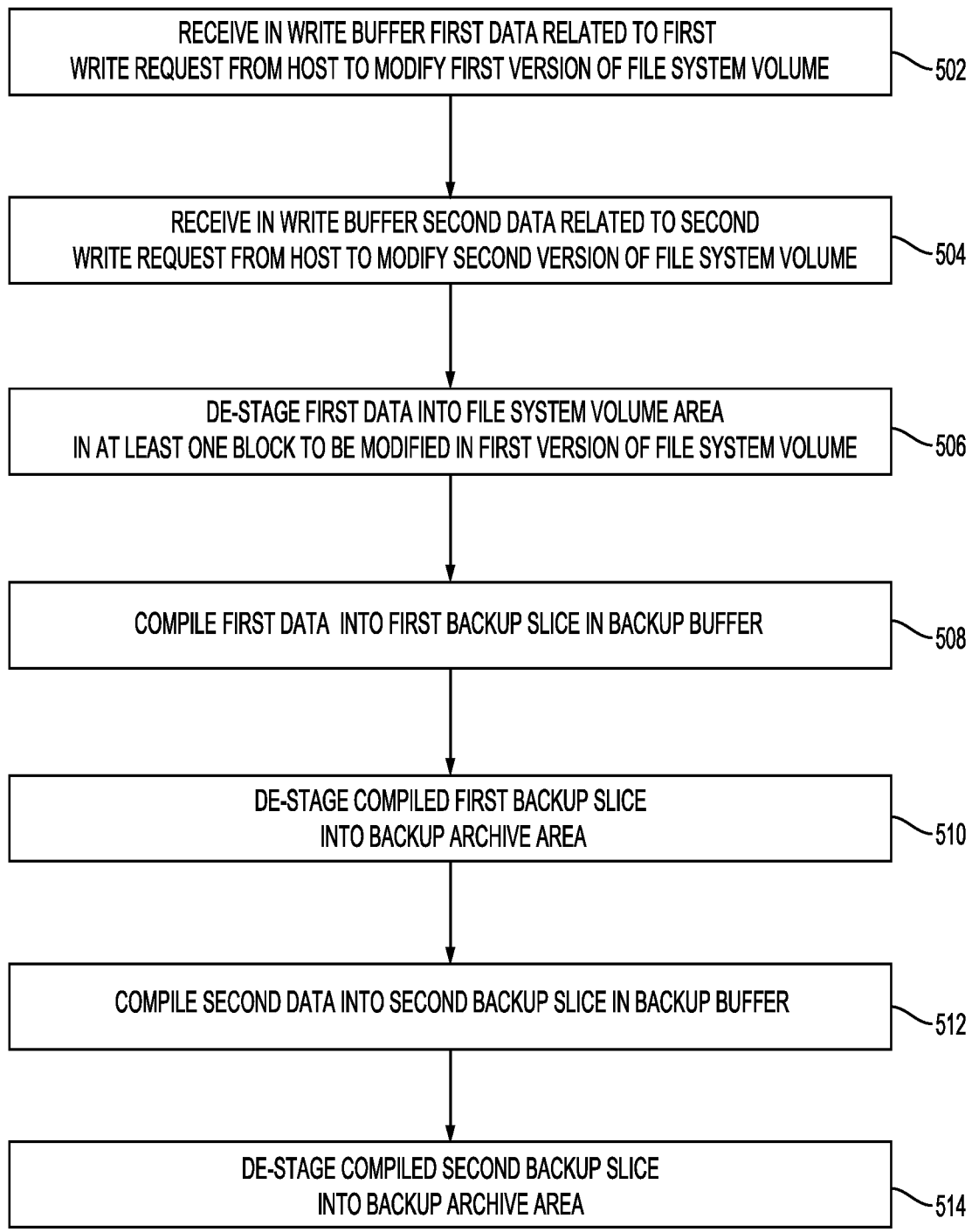
FIG. 5 is a flowchart for independently writing data for different versions of a file system volume according to an embodiment.

FIG. 5 is a flowchart for independently writing data for different versions of a file system volume that can be performed by circuitry 111 executing DSD firmware 16 according to an embodiment. In block 502, circuitry 111 receives in write buffer 14 first data related to a first write request from host 101 to modify a first version of the file system volume.

With reference to the example of FIG. 3, circuitry 111 may receive a first write request to modify $FS_0$ by writing user data or metadata in one or more blocks for $FS_0$. The modification can be to write or update one or more blocks of user data or metadata for the current version of the file system volume. In some implementations, write requests that do not specify a particular version of the file system volume to update are directed to the current version of the file system volume (e.g., $FS_0$ in FIG. 3) stored in FS volume area 18. In other implementations, the first write request may specify that the write request is directed to the current version of the file system volume. Host 101 may use file system driver 8 to indicate a version or branch of the file system volume for writing the first data included with the first write request.

In block 504, circuitry 111 receives second data in write buffer 14 related to a second write request received from host 101 to modify a second version of the file system (e.g., $FS_1$, $FS_2$, $FS_3$, $FS_4$, or $FS_5$ in FIG. 3). The modification can be to write or update one or more blocks of user data or metadata for the second version of the file system volume. The second write request can specify a particular version or branch of the file system volume that corresponds to a timestamp or identifier in backup mapping 23 that is associated with a snapshot stored in backup archive area 20. In this regard, backup mapping 23 can include identifiers used by file system driver 8 of host 101 for different versions of the file system volume, such as names or version numbers, that are associated with different snapshot identifiers or timestamps for snapshots stored in backup archive area 20. Host 101 may then use file system driver 8 to indicate the second version or branch of the file system volume for writing the second data included with the second write request.

In block 506, circuitry 111 de-stages the first data into FS volume area 18 in at least one block to be modified in the first version of the file system volume. In some implementations, the first data is copied from write buffer 14 into block locations in FS volume area 18 using a dedicated I/O core of circuitry 111.

In block 508, circuitry 111 compiles the first data in backup buffer 15 into a first backup slice (i.e., a checkpoint or snapshot) as part of a backup processing. In some implementations, hardware accelerator 114 may perform some or all of the backup processing, such as by compressing or compiling the first data into the first backup slice. In addition, circuitry 111 adds a timestamp or other time indication to the first backup slice for storage in backup archive area 20 indicating when the first write request was received or when the first version of the file system volume was modified. In some implementations, the order of blocks 506 and 508 may be switched so that the compilation of the first backup slice in backup buffer 15 may occur before the first data is de-staged from write buffer 14. In other implementations, blocks 506 and 508 may be performed at the same time, such as with the simultaneous use of an I/O core of circuitry 111 and hardware accelerator 114, so that the first data is de-staged while the first backup slice is compiled or de-staged.

In block 510, circuitry 111 de-stages the first backup slice compiled in block 508 into backup archive area 20 in non-volatile storage 118. Circuitry 111 stores the first backup slice in backup archive area 20 and maps the location of the first backup slice in backup archive area 20 using, for example, at least one of a timestamp or other identifier for the backup slice. Such mapping may be included in backup mapping 23 or stored in backup archive area 20. In addition, circuitry 111 may determine whether a backup slice is a snapshot or a checkpoint based on, for example, an amount of data that has been written since a last snapshot, a number of checkpoints or write requests since a last snapshot, an amount of time since a last snapshot, or an indication from host 101 as to whether the data should be retained as a snapshot or a checkpoint.

In block 512, circuitry 111 compiles the second data for the second write request into a second backup slice in backup buffer 15. In some implementations, hardware accelerator 114 may perform some or all of the backup processing, such as by compressing or compiling the second data into the second backup slice. In addition, circuitry 111 adds a timestamp or other time indication to the second backup slice for storage in backup archive area 20 indicating when the second write request was received or when the second version of the file system volume was modified.

In block 514, circuitry 111 de-stages the second backup slice compiled in block 512 into backup archive area 20 in non-volatile storage 118. Circuitry 111 maps a location for the second backup slice in backup archive area using, for example, at least one of a timestamp or identifier for the second backup slice. As discussed above, backup mapping 23 may be used to track the location of the backup slice in backup archive area 20, or mapping information such as an identifier or timestamp stored in backup archive area 20 may be used to track the location of the backup slice.

By using snapshots stored in backup archive area 20, it is ordinarily possible to allow host 101 to send write requests using file system driver 8 and DSD driver 11 to independently modify a particular version of a file system volume. This can allow for different versions of a file system volume to evolve independently from each other.

Figure 6:
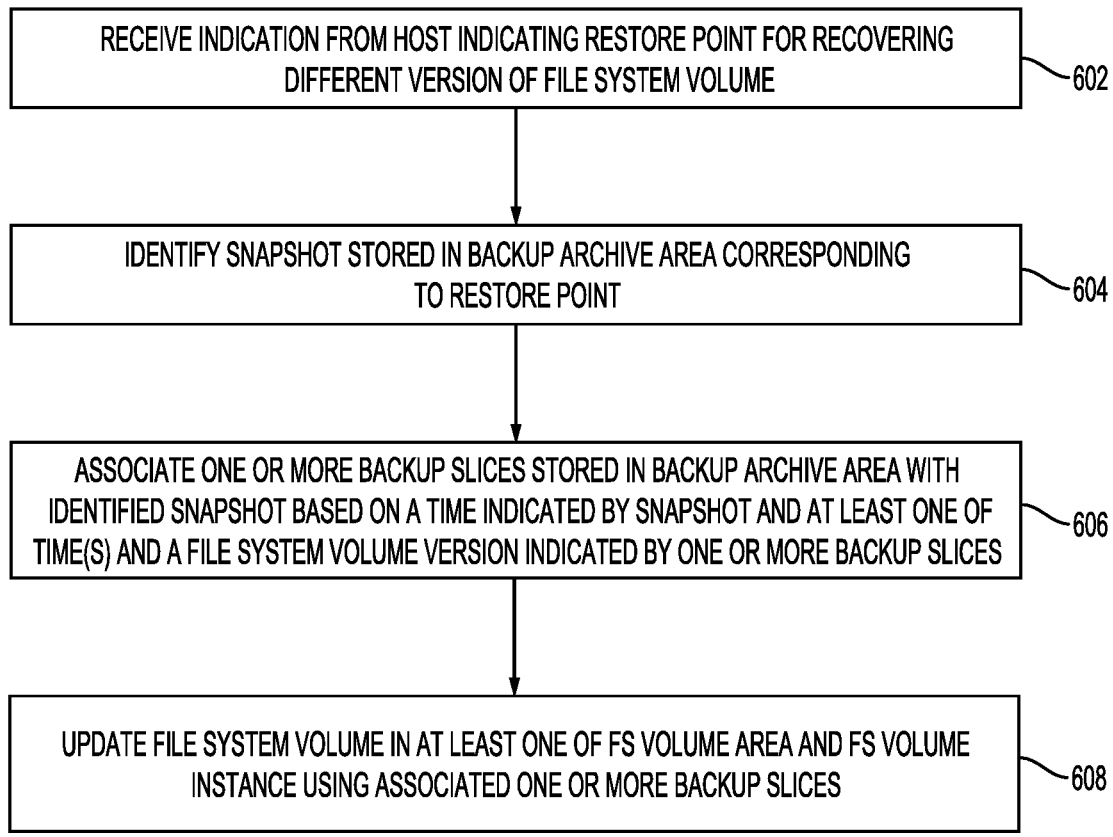
FIG. 6 is a flowchart for a recovery process for a version of a file system volume according to an embodiment.

FIG. 6 is a flowchart for a recovery process for a file system volume that can be performed by circuitry 111 executing DSD firmware 16 according to an embodiment. In block 602, DSD 108 receives an indication from host 101 indicating a restore point for recovering a different version of a file system volume. A user or application executing at host 101 may use file system driver 8 to select a restore point based on an earlier time. In some implementations, file system driver 8 may provide options for different times or different file system volume version numbers or names corresponding to certain snapshots stored in backup archive area 20, or may allow a user or application to indicate a time for rolling back the file system volume.

In one example, a user or application on host 101 may attempt to mount the current version of the file system volume (e.g., $FS_0$). If there is an error in mounting the current version, file system driver 8 may then attempt to mount the previous version or may allow the user or application to select from different versions of the file system volume. File system driver 8 may then send a file system volume version number to DSD 108 via DSD driver 11, or other identifier as a restore point associated with a particular snapshot stored in backup archive area 20.

In block 604, circuitry 111 identifies a snapshot corresponding to the restore point. In some implementations, circuitry 111 may use backup mapping 23 to identify the corresponding snapshot by associating the restore point with a snapshot identifier or timestamp in backup mapping 23. As discussed above with reference to FIG. 3, the snapshots stored in backup archive area 20 can include an indication of a time, such as an identifier or a timestamp for when a write request was received or when the file system was modified.

In block 606, circuitry 111 associates one or more backup slices stored in backup archive area 20 with the snapshot identified in block 604. Circuitry 111 uses the time indicated by the identified snapshot and at least one of a time or times and a file system volume version indicated by the one or more backup slices. In a case where the restore point is for an earlier version of the file system volume, circuitry 111 may associate all backup slices for the current version of the file system volume that have a timestamp or other indication of time, such as a sequence number, that is concurrent or older than the time indicated for the identified snapshot. In a case where the restore point is for an alternate version of the file system (e.g., $FS_1$ in FIG. 3), circuitry 111 may associate all backup slices for the current version of the file system volume that have a timestamp or other indication of time that is concurrent or older with the time indicated for the identified snapshot, and also associate the backup slices for the alternate version of the file system volume (e.g., checkpoints $23_1$ and snapshots $25_1$ for $FS_1$ in FIG. 3).

In block 608, the file system volume is updated in at least one of FS volume area 18 (e.g., $FS_0$) at DSD 108 and FS volume instance 12 at host 101 using the backup slices associated in block 606. In more detail, data for a most recent write request for each logical address in the file system volume can be located in the associated backup slices, and used to update or rewrite data for the logical address to the state indicated by the most recent write request in the associated backup slices in one or both of FS volume area 18 and FS volume instance 12. When updating FS volume instance 12, circuitry 111 may send the associated backup slices to host 101 for updating of FS volume instance 12 by FS driver 8. Logical addresses that do not have data for any write requests in the associated backup slices in FS volume area 18 or FS volume instance 12 can be left in their current state. This updating can ordinarily recreate the different version of the file system volume in FS volume area 18 and/or FS volume instance 12. In some cases, circuitry 111 may need to decompress or otherwise unpackage the data from the backup slices before rewriting the data in the current file system volume.

The foregoing recovery of a different version of the file system volume is performed with less involvement from host 101 as compared to conventional systems, since DSD 108 may only receive a restore point from host 101 and proceed with recovering the different version of the file system volume by identifying and associating backup slices at DSD 108.

Figure 7:
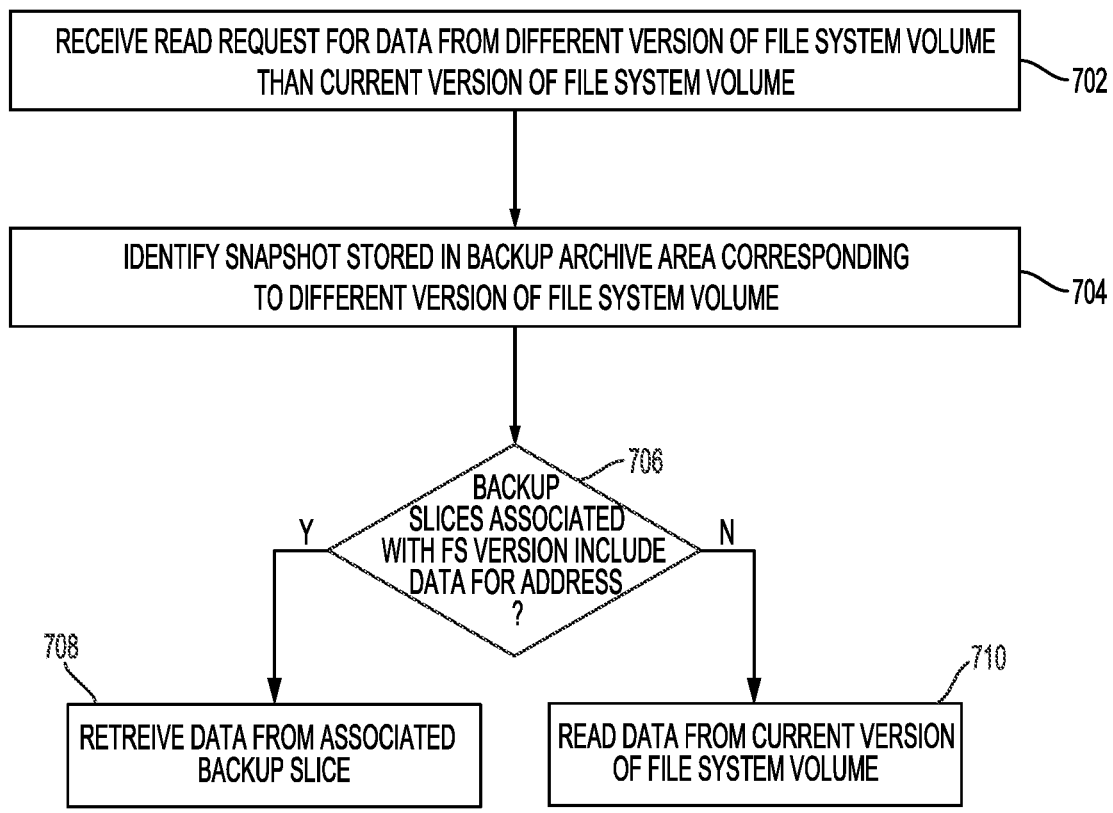
FIG. 7 is a flowchart for a read request process for data from a different version of a file system volume than a current version of the file system volume according to an embodiment.

FIG. 7 is a flowchart for a read request process for data from a different version of a file system volume than a current version of the file system volume. The process of FIG. 7 can be performed by circuitry 111 executing DSD firmware 16 according to an embodiment.

In block 702, DSD 108 receives a read request from host 101 for data from a different version of the file system volume than the current version of the file system volume stored in FS volume area 18. A user or application executing at host 101 may use file system driver 8 to select a particular version of the file system volume when requesting the data.

In some implementations, file system driver 8 may provide options for different times or different file system volume version numbers or names corresponding to certain snapshots stored in backup archive area 20.

In block 704, circuitry 111 identifies a snapshot stored in backup archive area 20 corresponding to the different version of the file system volume (e.g., snapshot 30 for $FS_1$ in FIG. 3). In some implementations, circuitry 111 may use backup mapping 23 to identify the corresponding snapshot by associating identifiers for different versions of the file system volume with a snapshot identifier or timestamp in backup mapping 23. As discussed above with reference to FIG. 3, the snapshots stored in backup archive area 20 can include an indication of a time, such as an identifier or a timestamp for when a write request was received or when the file system was modified.

In block 706, circuitry 111 determines whether one or more backup slices in backup archive area 20 that are associated with the different version of the file system volume include data for a logical address (e.g., LBA) of the read request. With reference to the example of FIG. 3, if the different version of the file system volume is $FS_1$, circuitry 111 in block 706 would determine whether any of checkpoints $23_1$ and any of snapshots $25_1$ include data corresponding to the logical address specified by the read request. In some implementations, backup mapping 23 can include logical addresses for the backup slices in addition to timestamps or other identifiers for the backup slices. In such implementations, circuitry 111 may use backup mapping 23 to identify the location for the requested data in backup archive area 20. In other implementations, circuitry 111 may search the associated backup slices in backup archive area 20 for the logical address from the read request.

In response to determining that one or more backup slices associated with the different version of the file system volume include data corresponding to the logical address, circuitry 111 in block 708 retrieves data for the address from an associated backup slice. If there are multiple associated backup slices including data for the address, an associated backup slice that includes data for the address and corresponds to a timestamp specified by host 101 will be used to retrieve the data. However, if a timestamp is not specified by host 101 or if a backup slice corresponding to a host specified timestamp does not include data for the address, the data is retrieved from an oldest backup slice of the associated backup slices that includes data for the address. If there is only one associated backup slice including data for the address, the data is retrieved from that backup slice. In some implementations, circuitry 111 may decompress or unpackage the data from the backup slice in order to perform the read request. The read request is then completed by returning the data retrieved from the backup slice to host 101.

On the other hand, if there are not any backup slices associated with the different version of the file system volume that include data corresponding to the logical address of the read request, data for the address is read from the current version of the file system volume in FS volume area 18. The read data is then returned to host 101 to complete the read command.

The foregoing read process of FIG. 7 ordinarily allows for host 101 to access data from a different version of the file system volume by only needing to specify the logical address and the version of the file system volume. As noted above, some implementations may also use a host-specified timestamp for retrieving the requested data, but DSD 108 handles the identification of the data for the different version of the file system volume without involving host 101.

Figure 8:
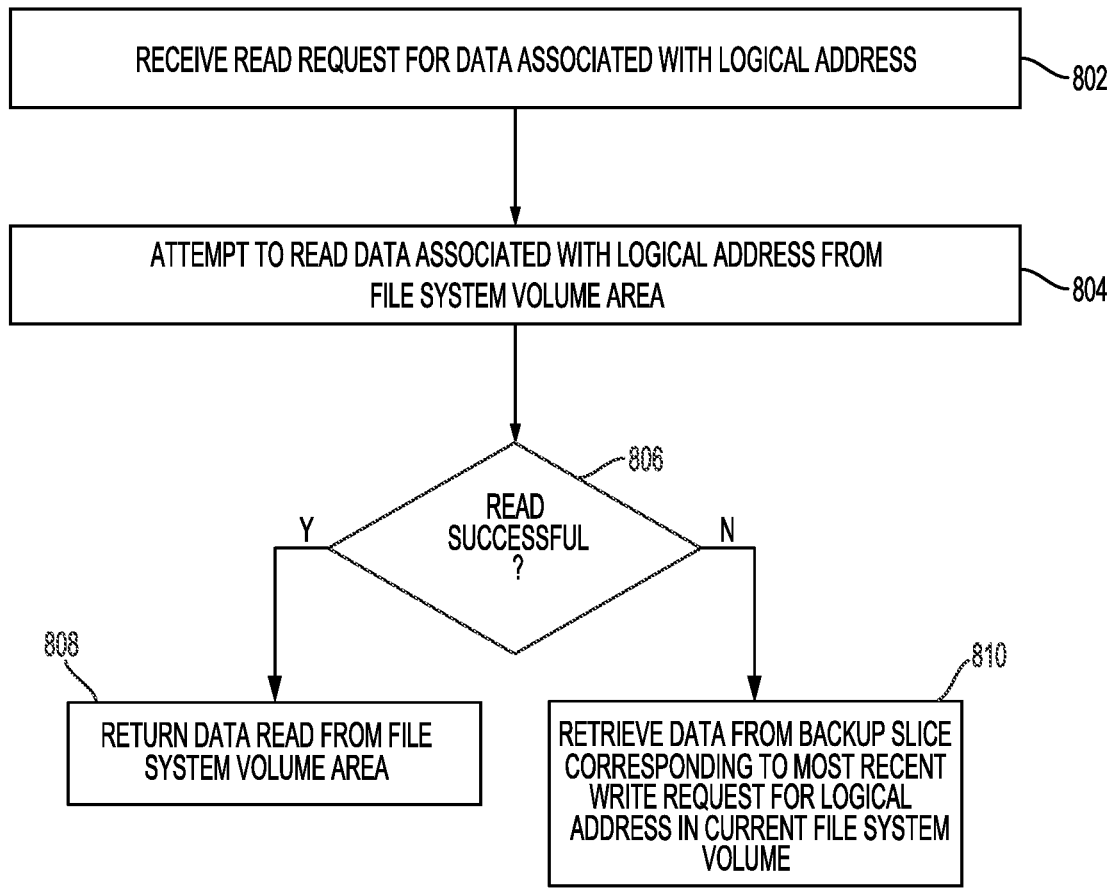
FIG. 8 is a flowchart for a read error handling process according to an embodiment.

FIG. 8 is a flowchart for a read error handling process that can be performed by circuitry 111 executing DSD firmware 16 according to an embodiment. The read error process of FIG. 8 ordinarily allows for data to be recovered and returned to host 101 for read requests that would otherwise be considered "unrecoverable." In addition, the process of FIG. 8 may be entirely hidden from host 101 so as not to affect or interrupt the processing performed by host 101.

In block 802, DSD 108 receives a read request from host 101 for data associated with a logical address (e.g., LBA). In block 804, circuitry 111 attempts to read the requested data from the current file system volume stored in FS volume area 18. The read attempt in block 804 may include performing a number of read retries up to a predetermined number of read retries if the data cannot be successfully read.

In block 806, circuitry 111 determines whether the read attempt in block 804 was successful in retrieving the requested data. As noted above, the increase in data density in newer DSDs can result in more read errors when attempting to read data from the DSD. In many cases, the higher data density can increase the likelihood of defects in a storage media of the DSD, or make the storage media more vulnerable to data corruption caused by environmental conditions or by writing nearby data.

If the read attempt is determined successful in block 808, circuitry 111 returns the data read from FS volume area 18 to host 101 to complete the read request. On the other hand, in response to a failure to read the data from FS volume area 18, circuitry 111 retrieves the data from a backup slice in backup archive area 20 corresponding to a most recent write request for the logical address in the current file system volume. In some implementations, circuitry 111 may search the checkpoints and snapshots in backup archive area 20 for the current file system volume starting with the most recent backup slice to identify data previously written for the logical address.

Circuitry 111 then completes the read request by returning the data from the backup slice to host 101. In some implementations, circuitry 111 may inform host 101 about the internal recovery by sending a warning flag or other message to host 101. In cases where no data has been previously written for the logical address, circuitry 111 may return zeroed data for the read request or may return an error message.

As discussed above, the compilation of backup slices in backup buffer 15 by circuitry 111 of DSD 108, and the de-staging of such backup slices into backup archive area 20 can ordinarily allow for less involvement of host 101 in the backup process, as compared to conventional systems that require a host to create a backup or archive file. Such backup processing at DSD 108 can also allow for data to be backed up more frequently, such as with each write request received from host 101. In addition, the foregoing arrangements can allow host 101 to recover different versions of the file system volume or data from different versions with most of the processing being handled by DSD 108, and with less data being exchanged between host 101 and DSD 108.

Other Embodiments

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

For example, and as discussed above, write buffer 14 and backup buffer 15 may be implemented as a single buffer or memory area, with one or both of data for storage in FS volume area 18 and backup slices for storage in backup archive area 20 being identified or otherwise tagged for their respective destinations. In another example, FS volume area 18 may serve as a main or primary destination for data to be written in DSD 108, without necessarily requiring that the main or primary destination represent one or more volumes of a file system related to a FS volume instance on a host.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or other circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, circuitry, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, a removable media, an optical media, or any other form of storage medium known in the art. An exemplary storage medium can be coupled to a processor such that the processor can read information from, and write information to, the storage medium. In the alternative, the storage medium may be integral to the processor. The processor and the storage medium may reside in an ASIC or an SoC.

What is claimed is:

1. A Data Storage Device (DSD), comprising:
a non-volatile storage configured to include a file system volume area and a backup archive area, the file system volume area configured to store a file system volume, and the backup archive area configured to store a plurality of backup slices including data for write requests for the file system volume;
a memory configured to include a write buffer and a backup buffer; and
circuitry coupled to the non-volatile storage and the memory, wherein the circuitry is configured to:
receive, in the write buffer, first data related to a first write request from a host to modify a first version of the file system volume stored in the file system volume area of the non-volatile storage;
receive, in the write buffer, second data related to a second write request from the host to modify a second version of the file system volume stored in the backup archive area of the non-volatile storage;
de-stage the first data into the file system volume area in at least one block to be modified in the first version of the file system volume;
compile the first data into a first backup slice in the backup buffer of the memory;
de-stage the compiled first backup slice into the backup archive area;
compile the second data into a second backup slice in the backup buffer; and
de-stage the compiled second backup slice into the backup archive area.

2. The DSD of claim 1, wherein the circuitry is further configured to compile data for each write request received from the host into a backup slice.

3. The DSD of claim 1, wherein the circuitry includes a hardware accelerator configured to perform at least one of compiling the data related to one or more write requests into a backup slice and de-staging the compiled backup slice into the backup archive area.

4. The DSD of claim 1, wherein the circuitry is further configured to:
receive an indication from the host indicating a restore point for recovering a different version of the file system volume;
identify a snapshot of the plurality of backup slices stored in the backup archive area corresponding to the restore point;
associate one or more backup slices stored in the backup archive area with the identified snapshot based on a time indicated by the identified snapshot and at least one of a time or times and a file system volume version indicated by the one or more backup slices; and
update the file system volume in the file system volume area using the associated one or more backup slices to recover the different version of the file system volume.

5. The DSD of claim 1, wherein the circuitry is further configured to:
receive a read request from the host for data from a different version of the file system volume than a current version of the file system volume stored in the file system volume area;
identify a snapshot of the plurality of backup slices stored in the backup archive area corresponding to the different version of the file system volume;
determine whether one or more backup slices associated with the different version of the file system volume include data corresponding to a logical address of the read request;

in response to determining that one or more backup slices associated with the different version of the file system volume include data corresponding to the logical address of the read request, retrieve data from an associated backup slice including data corresponding to the logical address to complete the read request; and in response to determining that there are not any backup slices associated with the different version of the file system volume that include data corresponding to the logical address of the read request, read data from the current version of the file system volume stored in the file system volume area to complete the read request.

6. The DSD of claim 1, wherein the circuitry is further configured to:
receive a read request from the host for data associated with a logical address;
attempt to read the data associated with the logical address from the file system volume area;
in response to a failure to read the data from the file system volume area, retrieve the data from a backup slice in the backup archive area corresponding to a most recent write request for the logical address in the current file system volume; and
complete the read request by returning the data retrieved from the backup slice to the host.

7. The DSD of claim 1, wherein the circuitry is further configured to associate identifiers for different versions of the file system volume with snapshots stored in the back-up archive area.

8. The DSD of claim 1, wherein the plurality of backup slices stored in the backup archive area include checkpoints designated for temporary storage and snapshots designated for long term storage, and wherein the backup archive area includes a checkpoint sub-area reserved for storing checkpoints, and a snapshot sub-area reserved for storing snapshots.

9. The DSD of claim 8, wherein the checkpoint sub-area is a circular buffer, and wherein the circuitry is further configured to:
write new checkpoints to a head of the checkpoint sub-area;
evict an oldest checkpoint from the checkpoint sub-area when the checkpoint sub-area becomes full; and
periodically copy a most recent checkpoint from the head of the checkpoint sub-area into the snapshot sub-area to convert the most recent checkpoint into a snapshot.

10. A Data Storage Device (DSD), comprising:
a non-volatile storage configured to include a file system volume area and a backup archive area, the file system volume area configured to store a file system volume, and the backup archive area configured to store a plurality of backup slices including data for write requests for the file system volume;
a memory configured to include a write buffer and a backup buffer; and
circuitry coupled to the non-volatile storage and the memory, wherein the circuitry is configured to:
receive an indication from a host indicating a restore point for recovering a different version of the file system volume than a current version of the file system volume stored in the file system volume area;
identify a snapshot of the plurality of backup slices stored in the backup archive area corresponding to the restore point;
associate one or more backup slices stored in the backup archive area with the identified snapshot based on a time indicated by the identified snapshot and at least one of a time or times and a file system volume version indicated by the one or more backup slices; and
update the file system volume in the file system volume area using the associated one or more backup slices to recover the different version of the file system volume.

11. A Data Storage Device (DSD), comprising:
a non-volatile storage configured to include a file system volume area and a backup archive area, the file system volume area configured to store a file system volume, and the backup archive area configured to store a plurality of backup slices including data for write requests for the file system volume;
a memory configured to include a write buffer and a backup buffer; and
circuitry coupled to the non-volatile storage and the memory, wherein the circuitry is configured to:
receive a read request from a host for data from a different version of the file system volume than a current version of the file system volume stored in the file system volume area;
identify a snapshot of the plurality of backup slices stored in the backup archive area corresponding to the different version of the file system volume;
determine whether one or more backup slices associated with the different version of the file system volume include data corresponding to a logical address of the read request;
in response to determining that one or more backup slices associated with the different version of the file system volume include data corresponding to the logical address of the read request, retrieve data from an associated backup slice including data corresponding to the logical address to complete the read request; and
in response to determining that there are not any backup slices associated with the different version of the file system volume that include data corresponding to the logical address of the read request, read data from the current version of the file system volume stored in the file system volume area to complete the read request.

12. A method of operating a Data Storage Device (DSD) including a memory and a non-volatile storage, the method comprising:
receiving, in a write buffer of the memory, data related to one or more write requests from a host to modify a file system volume stored in a file system volume area of the non-volatile storage;
de-staging the data related to the one or more write requests into the file system volume area in at least one block to be modified in the file system volume by the one or more write requests;
compiling the data related to the one or more write requests into a backup slice in a backup buffer of the memory;
de-staging the compiled backup slice into a backup archive area of the non-volatile storage;
receiving a read request from the host for data associated with a logical address;
attempting to read the data associated with the logical address from the file system volume area;
in response to a failure to read the data from the file system volume area, retrieving the data from a backup slice in the backup archive area corresponding to a most recent write request for the logical address in the current file system volume; and completing the read request by returning the data retrieved from the backup slice to the host.

13. The method of claim 12, further comprising compiling data for each write request received from the host into a backup slice.

14. The method of claim 12, wherein the DSD further includes a hardware accelerator configured to perform at least one of compiling the data related to the one or more write requests into the backup slice and de-staging the compiled backup slice into the backup archive area.

15. The method of claim 12, further comprising:
receiving, in the write buffer, first data related to a first write request from the host to modify a first version of the file system volume stored in the file system volume area of the non-volatile storage;
receiving, in the write buffer, second data related to a second write request from the host to modify a second version of the file system volume stored in the backup archive area of the non-volatile storage;
de-staging the first data into the file system volume area in at least one block to be modified in the first version of the file system volume;
compiling the first data into a first backup slice in the backup buffer;
de-staging the compiled first backup slice into the backup archive area;
compiling the second data into a second backup slice in the backup buffer; and
de-staging the compiled second backup slice into the backup archive area.

16. The method of claim 12, further comprising:
receiving an indication from the host indicating a restore point for recovering a different version of the file system volume;
identifying a snapshot of the plurality of backup slices stored in the backup archive area corresponding to the restore point;
associating one or more backup slices stored in the backup archive area with the different version of the file system volume based on a time indicated by the identified snapshot and at least one of a time or times and a file system volume version indicated by the one or more backup slices; and
updating the file system volume in at least one of the file system volume area and a file system volume instance on a host using the associated one or more backup slices to recover the different version of the file system volume.

17. The method of claim 12, further comprising:
receiving a read request from the host for data from a different version of the file system volume than a current version of the file system volume stored in the file system volume area;
identifying a snapshot of the plurality of backup slices stored in the backup archive area corresponding to the different version of the file system volume;
determining whether one or more backup slices associated with the different version of the file system volume in the backup archive area include data corresponding to a logical address of the read request;
in response to determining that one or more backup slices associated with the different version of the file system volume include data corresponding to the logical address of the read request, retrieving data from an associated backup slice corresponding to the logical address to complete the read request; and
in response to determining that there are not any backup slices associated with the different version of the file system volume that include data corresponding to the logical address of the read request, reading data from the current version of the file system volume stored in the file system volume area to complete the read request.

18. The method of claim 12, further comprising associating identifiers for different versions of the file system volume with snapshots stored in the back-up archive area.

19. The method of claim 12, wherein a plurality of backup slices stored in the backup archive area include checkpoints designated for temporary storage and snapshots designated for long term storage, and wherein the backup archive area includes a checkpoint sub-area reserved for storing checkpoints, and a snapshot sub-area reserved for storing snapshots.

20. The method of claim 19, wherein the checkpoint sub-area is a circular buffer, and wherein the method further comprises:
writing new checkpoints to a head of the checkpoint sub-area;
evicting an oldest checkpoint from the checkpoint sub-area when the checkpoint sub-area becomes full; and
periodically copying a most recent checkpoint from the head of the checkpoint sub-area into the snapshot sub-area to convert the most recent checkpoint into a snapshot.

21. A non-transitory computer-readable storage medium storing computer-executable instructions for operating a Data Storage Device (DSD) including a memory and a non-volatile storage, wherein when the computer-executable instructions are executed by circuitry of the DSD, the computer-executable instructions cause the circuitry to:
receive, in a write buffer of the memory, data related to one or more write requests from a host to modify a file system volume stored in a file system volume area of the non-volatile storage;
de-stage the data related to the one or more write requests into the file system volume area in at least one block to be modified in the file system volume by the one or more write requests;
compile the data related to the one or more write requests into a backup slice in a backup buffer of the memory;
de-stage the compiled backup slice into a backup archive area of the non-volatile storage, wherein a plurality of backup slices stored in the backup archive area includes checkpoints designated for temporary storage and snapshots designated for long term storage, and wherein the backup archive area includes a checkpoint sub-area reserved for storing checkpoints, and a snapshot sub-area reserved for storing snapshots;
write new checkpoints to a head of the checkpoint sub-area;
evict an oldest checkpoint from the checkpoint sub-area when the checkpoint sub-area becomes full; and
periodically copy a most recent checkpoint from the head of the checkpoint sub-area into the snapshot sub-area to convert the most recent checkpoint into a snapshot.

\* \* \* \* \*